(12) United States Patent
Watanabe et al.

(10) Patent No.: US 12,013,381 B2
(45) Date of Patent: Jun. 18, 2024

(54) GAS PHASE COMPONENT ANALYSIS DEVICE AND GAS PHASE COMPONENT ANALYSIS METHOD

(71) Applicant: FRONTIER LABORATORIES LTD., Koriyama (JP)

(72) Inventors: Chuichi Watanabe, Fukushima (JP); Atsushi Watanabe, Fukushima (JP); Koji Tei, Fukushima (JP)

(73) Assignee: FRONTIER LABORATORIES LTD., Koriyama (JP)

( * ) Notice: Subject to any disclaimer, the term of this patent is extended or adjusted under 35 U.S.C. 154(b) by 337 days.

(21) Appl. No.: 17/167,383

(22) Filed: Feb. 4, 2021

(65) Prior Publication Data
US 2021/0405000 A1 Dec. 30, 2021

(30) Foreign Application Priority Data
Jun. 24, 2020 (JP) .................................. 2020-109044
Dec. 24, 2020 (JP) .................................. 2020-215423

(51) Int. Cl.
*G01N 30/68* (2006.01)
*G01N 30/46* (2006.01)
(Continued)

(52) U.S. Cl.
CPC ........... *G01N 30/68* (2013.01); *G01N 30/466* (2013.01); *G01N 30/6034* (2013.01);
(Continued)

(58) Field of Classification Search
CPC .. G01N 30/68; G01N 30/466; G01N 30/6034; G01N 30/6095; G01N 30/78;
(Continued)

(56) References Cited

U.S. PATENT DOCUMENTS

| 5,498,279 | A | * | 3/1996 | Klemp | ................. | G01N 30/463 |
| | | | | | | 96/104 |
| 2012/0272715 | A1 | * | 11/2012 | Kriel | .................... | G01N 33/241 |
| | | | | | | 73/23.42 |
| 2020/0166484 | A1 | * | 5/2020 | Masuda | ............. | G01N 30/7206 |

FOREIGN PATENT DOCUMENTS

| JP | S60-173067 | 11/1985 |
| JP | S60-231161 | 11/1985 |

(Continued)

OTHER PUBLICATIONS

Japanese Office Action dated Jul. 5, 2022, 4 pages.

*Primary Examiner* — Robert A Hopkins
(74) *Attorney, Agent, or Firm* — Rankin, Hill & Clark LLP (57) ABSTRACT

A gas phase component analysis device and a gas phase component analysis method that can prevent degradation of the device due to an unnecessary component and can obtain excellent detection sensitivity are provided.

A gas phase component analysis device (1) includes a heating unit (2) configured to heat a specimen to generate a gas phase component composite, a first column (31) into which the gas phase component composite is introduced, a second column (32) that is a separation column connected with the first column (31) through a connection unit (33), an isothermal oven (3) housing the first column (31), the second column (32), and the connection unit (33), a detection unit (4) configured to detect a gas phase component having passed through the second column (32), and a suction unit (5) connected with the connection unit (33).

2 Claims, 5 Drawing Sheets

(51) Int. Cl.
*G01N 30/60* (2006.01)
*G01N 30/78* (2006.01)
*G01N 30/88* (2006.01)
G01N 30/00 (2006.01)
G01N 30/02 (2006.01)
G01N 30/06 (2006.01)
G01N 30/64 (2006.01)

(52) U.S. Cl.
CPC ......... *G01N 30/6095* (2013.01); *G01N 30/78* (2013.01); *G01N 30/88* (2013.01); *G01N 2030/0095* (2013.01); *G01N 2030/025* (2013.01); *G01N 2030/062* (2013.01); *G01N 2030/642* (2013.01); *G01N 2030/8881* (2013.01)

(58) Field of Classification Search
CPC ........... G01N 30/88; G01N 2030/0095; G01N 2030/025; G01N 2030/062; G01N 2030/642; G01N 2030/8881; G01N 30/06; G01N 30/32; G01N 30/08; G01N 30/7213
USPC ......................................................... 96/102
See application file for complete search history.

(56) References Cited

FOREIGN PATENT DOCUMENTS

| | | |
|---|---|---|
| JP | H08-313510 | 11/1996 |
| JP | 2001-337078 | 12/2001 |
| JP | 3965234 B2 * | 8/2007 |
| JP | 2018-066618 | 4/2018 |
| WO | 2006/077912 | 7/2006 |
| WO | WO-2006077912 A1 * | 7/2006 ............. G01N 30/12 |

* cited by examiner

GAS PHASE COMPONENT ANALYSIS DEVICE AND GAS PHASE COMPONENT ANALYSIS METHOD

BACKGROUND OF THE INVENTION

Field of the Invention

The present invention relates to a gas phase component analysis device and a gas phase component analysis method.

Description of the Related Art

Conventionally, gas chromatography has been known as a method of analyzing a gas phase component. For example, a known gas phase component analysis device (gas chromatograph) used in the gas chromatography includes a heating unit configured to heat a specimen to generate a gas phase component composite, a separation column connected with the heating unit and configured to separate the gas phase component composite generated by the heating unit into individual components, an isothermal oven in which the separation column is housed, and a detector connected with the separation column and configured to detect the components obtained through the separation by the separation column.

The heating unit generates the gas phase component composite by thermally decomposing or sublimating the specimen or by heating the specimen to thermally desorb components included in the specimen. The detector is, for example, a mass spectrometric detector (MSD), a hydrogen flame ionization detector (FID), or an electron capture detector (ECD).

When a dilute specimen having a specimen concentration less than 0.01 mass % is analyzed with the gas phase component analysis device, 90 mass % or more of a gas phase component composite generated as described above is introduced into the separation column and analyzed. However, with this process, the separation column is degraded by an unreacted methylating agent such as tetramethylanmoniumhydoxide (TMAH) used when the gas phase component composite contains carboxylic acid, or the sensitivity of a hydrogen flame ionization detector (FID) used as the detector is changed by a silylating agent such as hexamethyldisilazane (HMDS), which has been a problem. Furthermore, in the gas phase component analysis device in which a mass spectrometric detector (MSD) is used as the detector, a large amount of solvent flows into the mass spectrometric detector (MSD) when the gas phase component composite 10 to 50 times more than normal is injected into the separation column to achieve high-sensitivity detection, and accordingly, high vacuum cannot be maintained and an operational defect occurs, which has been another problem.

In a known gas phase component analysis device for solving the above-described problems (refer to Japanese Patent Laid-open No. 2018-66618, for example), the heating unit includes a split vent so that part of the gas phase component composite is selectively introduced into the separation column and the rest is discharged to the outside.

When a specimen having a specimen concentration of 0.01 mass % or more is analyzed with the gas phase component analysis device disclosed in Japanese Patent Laid-open No. 2018-66618, 90 to 99% of a gas phase component composite generated as described above is discharged to the outside through the split vent, and 1 to 10% of the gas phase component composite is introduced into the separation column and analyzed. As a result, with the gas phase component analysis device disclosed in Japanese Patent Laid-open No. 2018-66618, an unnecessary component such as a methylating agent, a silylating agent, or a solvent as described above can be discharged to the outside, and only an analysis target component can be introduced into the separation column.

SUMMARY OF THE INVENTION

However, the gas phase component analysis device disclosed in Japanese Patent Laid-open No. 2018-66618 has a disadvantage in that detection sensitivity decreases as the amount of a gas phase component composite introduced into the separation column decreases.

An object of the present invention is to solve the disadvantage and provide a gas phase component analysis device and a gas phase component analysis method that can prevent degradation of a separation column and a detector due to an unnecessary non-analysis target component and can obtain excellent detection sensitivity.

To achieve the object, a gas phase component analysis device of the present invention includes: a heating unit configured to heat a specimen to generate a gas phase component composite; a first column into which the gas phase component composite generated by the heating unit is introduced; a second column that is a separation column connected with the first column through a connection unit; an isothermal oven housing the first column, the second column, and the connection unit; and a detection unit configured to detect a gas phase component having passed through the second column, wherein the gas phase component analysis device further comprises a suction unit connected with the connection unit.

A gas phase component analysis method of the present invention uses the gas phase component analysis device and includes: a process of, when the specimen is heated by the heating unit to generate the gas phase component composite, activating the suction unit, inputting or injecting the specimen into the heating unit, activating the suction unit for a predetermined time after the inputting or injection of the specimen to discharge a non-analysis target component to outside through the suction unit, and setting the temperature of the first column to be higher than the boiling point of the non-analysis target component and lower than the boiling point of an analysis target component so that the analysis target component is selectively captured by the first column; and a process of stopping the suction unit after the predetermined time, increasing the temperature of the isothermal oven to a temperature equal to or higher than the boiling point of the analysis target component, and introducing the analysis target component into the second column.

In the gas phase component analysis device and the gas phase component analysis method of the present invention, first, the specimen is heated by the heating unit to thermally decompose or sublimate the specimen or to thermally desorb a gas phase component from the specimen, thereby generating the gas phase component composite. In this case, when the suction unit is activated, the specimen is input or injected into the heating unit, and the suction unit is activated for a predetermined time after the inputting or injection of the specimen, the gas phase component composite is sucked and all the gas phase component composite is introduced into the first column. The gas phase component composite contains an analysis target component of a high boiling point and low volatility and a non-analysis target component of a low boiling point and high volatility, such as a solvent. Since the temperature of the first column is set to be higher than the boiling point of the non-analysis target component and lower than the boiling point of the analysis target component, the non-analysis target component is further sucked toward the suction unit without being captured by the first column, but the analysis target component is selectively captured by the first column.

As described above, the first column is connected with the second column through the connection unit and the suction unit is connected with the connection unit. However, the second column acts as a flow path resistance, and thus the non-analysis target component is sucked by the suction unit without being introduced into the second column and is discharged to the outside through the suction unit.

Subsequently after the non-analysis target component is discharged to the outside, the suction unit is stopped after the predetermined time, and the temperature of the isothermal oven is increased to a temperature equal to or higher than the boiling point of the analysis target component. In this manner, the analysis target component captured by the first column vaporizes and moves toward the connection unit. In this case, the vaporized analysis target component is introduced into the second column since the suction unit is stopped and the connection unit is closed on a side where the connection unit is connected with the suction unit. The analysis target component introduced into the second column, which is a separation column, is separated into individual gas phase components, and the individual gas phase components having passed through the second column are detected by the detection unit.

As described above, in the gas phase component analysis device and the gas phase component analysis method of the present invention, all the gas phase component composite generated by the heating unit is introduced into the first column, but the non-analysis target component such as a solvent is discharged to the outside. The analysis target component is captured and condensed by the first column, and then introduced into the second column. Thus, according to the gas phase component analysis device and the gas phase component analysis method of the present invention, it is possible to prevent degradation of the separation column and a detector due to the unnecessary non-analysis target component such as a solvent and obtain excellent detection sensitivity.

The gas phase component analysis device of the present invention may include a selective introduction unit (such as a backflushing device) configured to selectively introduce part of the gas phase component composite generated by the heating unit into the first separation column and discharge the rest to the outside.

In the gas phase component analysis method of the present invention, the predetermined time for which the suction unit is activated after the inputting or injection of the specimen into the heating unit is preferably one second to three minutes after the inputting or injection of the specimen. With this configuration, the non-analysis target component can be reliably discharged to the outside. When the predetermined time is shorter than one second after the inputting or injection of the specimen, the non-analysis target component cannot be sufficiently discharged to the outside. When the predetermined time is longer than three minutes after the inputting or injection of the specimen, no further effect is obtained.

In the gas phase component analysis method of the present invention, the first column is preferably cooled by a refrigerant to set the temperature of the first column to be higher than the boiling point of the non-analysis target component and lower than the boiling point of the analysis target component. With this configuration, the temperature of the first column can be reliably set to be lower than the boiling point of the analysis target component.

DETAILED DESCRIPTION OF THE PREFERRED EMBODIMENT

An embodiment of the present invention will be described below in further detail with reference to the accompanying drawings.

Figure 1:
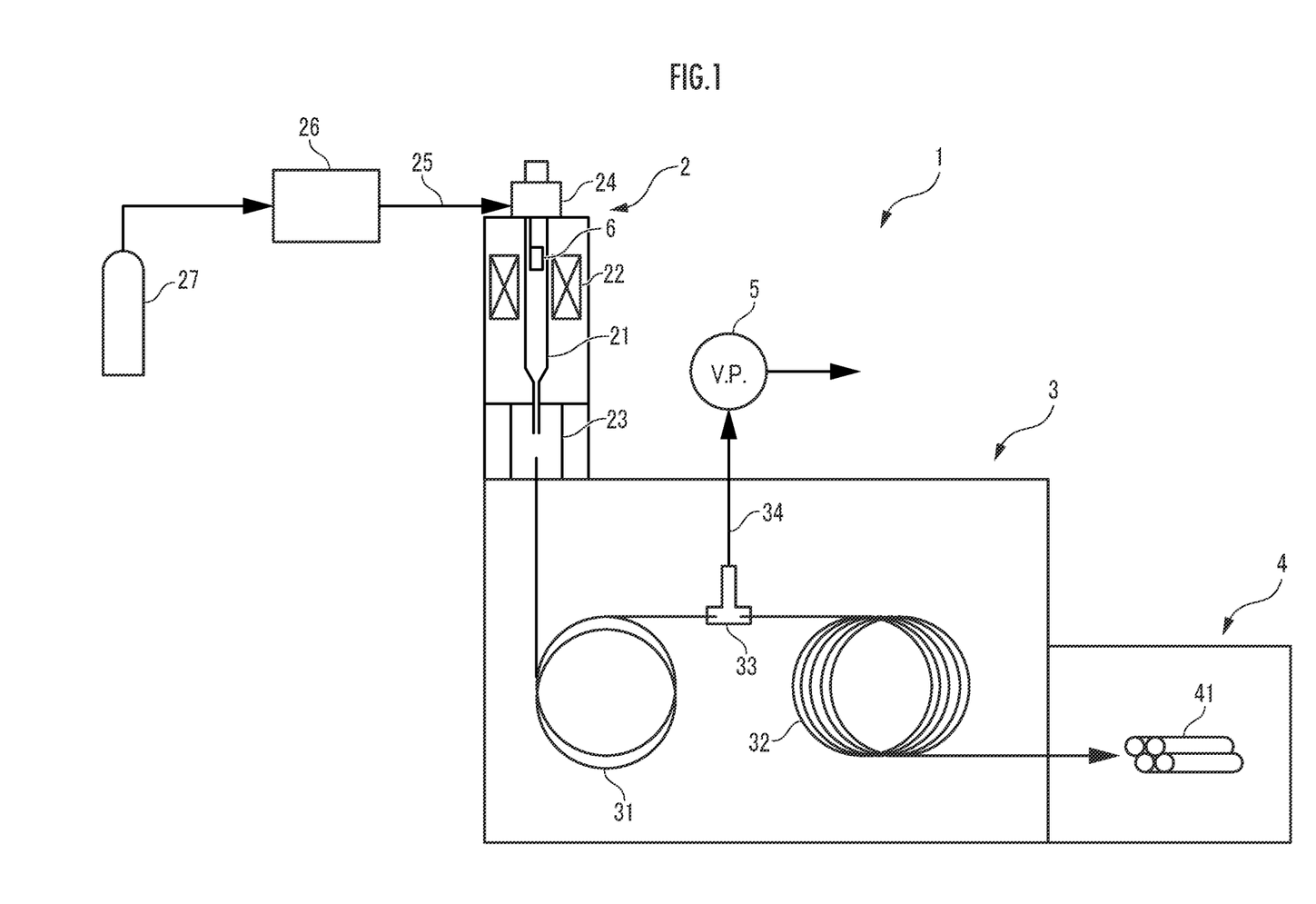
FIG. 1 is an explanatory cross-sectional view illustrating an exemplary configuration of a gas phase component analysis device of the present invention.

As illustrated in FIG. 1, a gas phase component analysis device 1 of the present embodiment is a gas chromatograph and includes a heating device 2, an isothermal oven 3 connected with the heating device 2, and a detection device 4 connected with the isothermal oven 3.

The heating device 2 includes a thermal decomposition furnace 21 made of a hollow cylindrical quartz tube that is chemically inactive, a heater 22 provided around the thermal decomposition furnace 21, and a GC inlet 23 into which a leading end of the thermal decomposition furnace 21 is inserted. The heater 22 heats the thermal decomposition furnace 21 under a predetermined condition by a temperature control device (not illustrated). The thermal decomposition furnace 21 is connected with an upper part of the GC inlet 23 through a heated pipe or the like, or is detachably mounted on the upper part. The thermal decomposition furnace 21 may be made of, in place of the quartz tube, a stainless steel pipe that is made inactive by forming a quartz thin film on an inner surface of the pipe.

The GC inlet 23 includes a heater (not illustrated), and similarly to the heater 22, the heater heats the GC inlet 23 under a predetermined condition by the temperature control device (not illustrated). A septum (not illustrated) is mounted on an upper end of the GC inlet 23 when the thermal decomposition furnace 21 is not connected with nor mounted on the upper part of the GC inlet 23.

The heating device 2 includes a specimen introduction unit 24 connected above the thermal decomposition furnace 21. The specimen introduction unit 24 is connected with a carrier gas conduit pipe 25 that is a carrier gas introduction unit configured to introduce carrier gas into the thermal decomposition furnace 21. The other end part of the carrier gas conduit pipe 25 is connected with a carrier gas source 27 through a flow rate control device 26. The carrier gas conduit pipe 25 is connected with the GC inlet 23 when the thermal decomposition furnace 21 is not connected with nor mounted on the upper part of the GC inlet 23.

With this configuration, the carrier gas supplied from the carrier gas source 27 is adjusted to a predetermined flow rate by the flow rate control device 26 and introduced into the thermal decomposition furnace 21 or the GC inlet 23.

The isothermal oven 3 houses a precolumn 31 as a first column, a main separation column 32 as a second column that is a separation column, and a three-way pipe (T-shaped pipe) 33 as a connection unit connecting the precolumn 31 and the main separation column 32. The precolumn 31 has one end inserted into the GC inlet 23 and facing the leading end of the thermal decomposition furnace 21, and the other end connected with the main separation column 32 through the three-way pipe 33. The main separation column 32 has one end connected with the precolumn 31 through the three-way pipe 33, and the other end connected with a detection unit 41 such as a quadrupole mass spectrometric detector housed in the detection device 4.

The three-way pipe 33 linearly connects the precolumn 31 and the main separation column 32 and is connected with a discharge conduit pipe 34 in a direction orthogonal to the direction of connection between the precolumn 31 and the main separation column 32. The discharge conduit pipe 34 is connected with a suction pump 5 such as a vacuum pump provided outside of the isothermal oven 3.

The precolumn 31 may be, for example, a stainless steel capillary column having an inner diameter of 0.25 mm and a length of 1 m and including, on an inner surface, a fixation layer made of a copolymer of methyl phenyl poly siloxane and dimethyl poly siloxane at 5:95 (mole ratio) and having a thickness of 0.25 µm, a capillary column having an inner diameter of 0.1 to 0.5 mm approximately and a length of 0.5 to 19 m and having an inner surface on which various polymers are applied, or a capillary tube having an inner surface chemically inactivated without polymer application. The main separation column 32 may be, for example, a stainless steel capillary column having an inner diameter of 0.25 mm and a length of 30 m and including, on an inner surface, a fixation layer made of a copolymer of methyl phenyl poly siloxane and dimethyl poly siloxane at 5:95 (mole ratio) and having a thickness of 0.25 µm.

The precolumn 31 is detachable from the GC inlet 23 and the three-way pipe 33 and may be selected in accordance with an analysis target.

The detection unit 41 may be a mass spectrometric detector (MSD) such as the quadruple mass spectrometric detector, a hydrogen flame ionization detector (FID), an electron capture detector (ECD), or the like.

Subsequently, a gas phase component analysis method of the present embodiment using the gas phase component analysis device 1 illustrated in FIG. 1 will be described below.

In the gas phase component analysis method of the present embodiment, first, the thermal decomposition furnace 21 is heated to a predetermined temperature by the heater 22 while the carrier gas such as helium or nitrogen is supplied at the flow rate of 5 to 150 ml/min from the carrier gas source 27 to the thermal decomposition furnace 21 through the flow rate control device 26. Subsequently, after the suction pump 5 is activated, a solid or liquid specimen housed in a specimen cup 6 is input to the thermal decomposition furnace 21. Then, a gas phase component composite is generated by thermally decomposing the solid specimen or sublimating the liquid specimen or by thermally desorbing a gas phase component from the solid specimen.

When the thermal decomposition furnace 21 is not connected with nor mounted on the upper part of the GC inlet 23, the gas phase component composite can be generated by injecting a liquid or gas specimen from the septum to the GC inlet 23 through a micro syringe (not illustrated) and heating the specimen to sublimate the liquid or gas specimen.

Subsequently, the suction pump 5 is activated for a predetermined time, for example, one second to three minutes after the inputting or injection of the specimen, thereby introducing all the gas phase component composite into the precolumn 31. In this case, the precolumn 31 is controlled to a predetermined temperature by the isothermal oven 3 or cooled by a refrigerant such as liquid nitrogen, liquid carbon dioxide, or ice so that the temperature of the precolumn 31 is set to be higher than the boiling point of a non-analysis target component contained in the gas phase component composite and lower than the boiling point of an analysis target component. As a result, the non-analysis target component such as a solvent of high volatility is further sucked toward the suction pump 5 without being captured by the precolumn 31, but the analysis target component is selectively captured and condensed by the precolumn 31.

As described above, the precolumn 31 is connected with the main separation column 32 through the three-way pipe (T-shaped pipe) 33, and the suction pump 5 is connected with the three-way pipe 33 through the discharge conduit pipe 34. However, since the main separation column 32 acts as a flow path resistance, the non-analysis target component is sucked into the suction pump 5 through the discharge conduit pipe 34 and discharged to the outside without being introduced into the main separation column 32 in effect. When the main separation column 32 is connected with a mass spectrometric detector (MSD), the inside of the mass spectrometric detector is vacuum, and thus the non-analysis target component is slightly introduced into the main separation column 32. However, the amount of the introduced non-analysis target component is small, and thus neither degradation of the main separation column 32 nor operational defect of the mass spectrometric detector are caused.

Subsequently, the suction pump 5 is stopped after the predetermined time, and the temperature of the isothermal oven 3 is increased to a temperature equal to or higher than the boiling point of the analysis target component. Accordingly, the analysis target component captured by the precolumn 31 vaporizes and moves toward the three-way pipe 33. In this case, since the suction pump 5, which acts as a valve at the discharge conduit pipe 34, is stopped and the valve is closed, the vaporized analysis target component is introduced into the main separation column 32 by controlling the flow rate of the carrier gas and separated into individual gas phase components, which are then detected by the detection unit 41.

As described above, in the gas phase component analysis method of the present embodiment using the gas phase component analysis device 1, a non-analysis target component such as a solvent is discharged to the outside but an analysis target component is captured and condensed by the precolumn 31 and then introduced into the main separation column 32. Thus, it is possible to prevent degradation of the main separation column 32 and the detection unit 41 due to the non-analysis target component and obtain excellent detection sensitivity.

Figure 2:
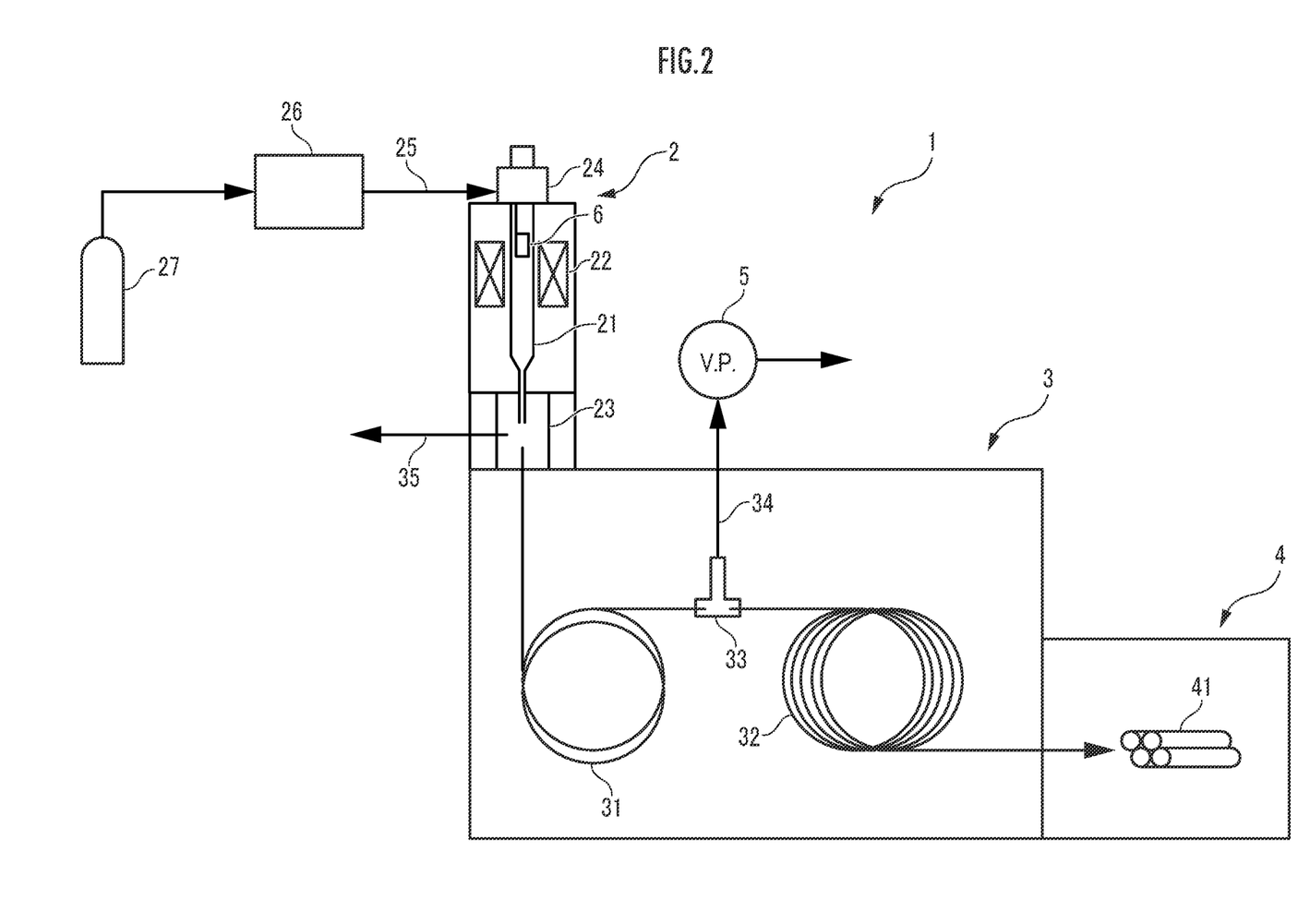
FIG. 2 is an explanatory cross-sectional view illustrating another exemplary configuration of the gas phase component analysis device of the present invention.

As illustrated in FIG. 2, the gas phase component analysis device 1 may include, at the GC inlet 23, a split vent 35 as a selective introduction unit configured to selectively introduce the gas phase component composite to the precolumn 31. The split vent 35 introduces, into the precolumn 31, part of the gas phase component composite introduced from the thermal decomposition furnace 21 or generated at the GC inlet 23, and discharges the rest to the outside through a discharge pipe 36.

When a specimen having a specimen concentration of 0.01 mass % or more is analyzed by the gas phase component analysis device 1 illustrated in FIG. 2, which includes the split vent 35, 90 to 99% of the gas phase component composite introduced from the thermal decomposition furnace 21 or generated at the GC inlet 23 can be discharged to the outside, and 1 to 10% of the gas phase component composite can be introduced from the precolumn 31 into the main separation column 32 and analyzed. When the gas phase component analysis device 1 including the split vent 35 is used by the gas phase component analysis method of the present embodiment, first, the split vent 35 is closed for five seconds to five minutes and the suction pump 5 is activated. Then, while the carrier gas such as helium or nitrogen is supplied at the flow rate of 5 to 150 ml/min from the carrier gas source 27 to the thermal decomposition furnace 21 through the flow rate control device 26, the specimen is input or injected into the thermal decomposition furnace 21 or the GC inlet 23 and is thermally decomposed or sublimated or is thermally desorbed, thereby generating a gas phase component composite. The split vent 35 does not work in effect when the suction pump 5 is activated. However, after the suction pump 5 is stopped, the split vent 35 works as normal so that the carrier gas, the flow rate of which is controlled is introduced into the precolumn 31 as described above, and thus the gas phase component analysis device 1 including the split vent 35 can be activated similarly to the gas phase component analysis device 1 illustrated in FIG. 1.

Subsequently, examples will be described.

EXAMPLES

Example 1

In the present example, first, a hexane solution in which hydrocarbon having a carbon number 9 to 22 and ester thereof are each contained at the concentration of 500 ppm was prepared as a specimen.

Subsequently, in the gas phase component analysis device 1 illustrated in FIG. 2, the specimen of 1 µL was injected into the GC inlet 23 through a micro syringe and the specimen was sublimated to generate a gas phase component composite.

In the present example, in the gas phase component analysis device 1, the precolumn 31 was a stainless steel capillary column having an inner diameter of 0.25 mm and a length of 1 m and including, on an inner surface, a fixation layer made of a copolymer of methyl phenyl poly siloxane and dimethyl poly siloxane at 5:95 (mole ratio) and having a thickness of 0.25 µm, and the main separation column 32 was a stainless steel capillary column (UA5-30M-0.25F manufactured by Frontier Laboratories Ltd.) having an inner diameter of 0.25 mm and a length of 30 m and including, on an inner surface, a fixation layer made of a copolymer of methyl phenyl poly siloxane and dimethyl poly siloxane at 5:95 (mole ratio) and having a thickness of 0.25 µm. The detection unit 41 was a quadrupole mass spectrometric detector (scanning range: m/z 10 to 400).

Analysis was performed under a condition that carrier gas is supplied at the flow rate of 1.0 ml/min from a carrier gas source 26 to the GC inlet 23 through a flow rate control device 25, the split ratio of the split vent 35 is 1/10 (1/10 of an introduced gas phase component is introduced into the precolumn 31), the temperature of the GC inlet 23 is 350° C., and the temperature of the isothermal oven 3 is held at 40° C. for two minutes and then heated to 300° C. at the temperature increase speed of 20° C./min. The upper part of FIG. 3 illustrates a result of the analysis when the suction pump 5 was not activated at all, and the lower part of FIG. 3 illustrates a result of the analysis when the suction pump 5 was activated before the specimen injection and was activated for 10 seconds after the specimen injection and then stopped.

Figure 3:
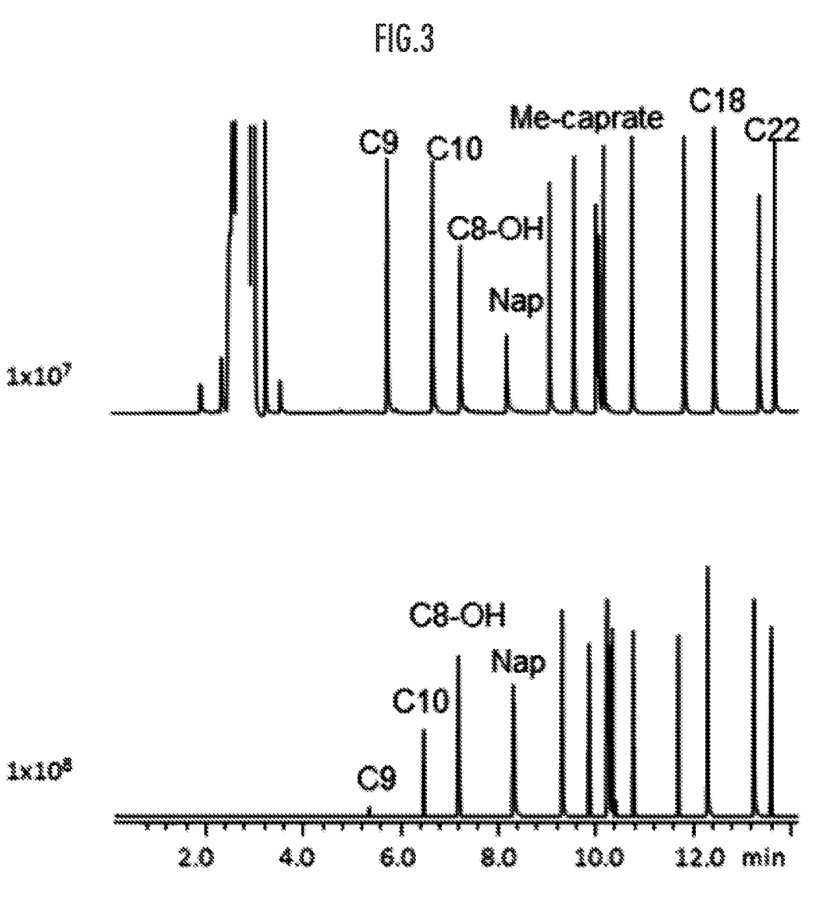
FIG. 3 is a diagram illustrating an exemplary analysis by the gas phase component analysis device and a gas phase component analysis method of the present invention.

In FIG. 3, solvent peaks are observed in the holding time range of one to five minutes and the absolute intensity is $1 \times 10^7$ when the suction pump 5 was not activated at all. However, when the suction pump 5 was activated before the specimen injection and activated for 10 seconds after the specimen injection and then stopped, no solvent peaks are observed, the absolute intensity is $1 \times 10^8$, which is 10 times larger, and the hydrocarbons are clearly separated from each other, which indicates that excellent detection sensitivity was obtained.

Example 2

In the present example, first, a dichloromethane solution containing polystyrene having an average molecular weight of 300000 at the concentration of 0.5 µg/µL and methyl stearate as an internal reference at the concentration of 0.05 µg/µL was prepared as a specimen.

Subsequently, in the gas phase component analysis device 1 illustrated in FIG. 2, the specimen of 5 µL was collected in the specimen cup 6, and then, after a solvent was sublimated at room temperature (25° C.), the specimen was input to the thermal decomposition furnace 21 heated at 600° C. and was thermally decomposed to generate a gas phase component composite.

In the present example, in the gas phase component analysis device 1, the precolumn 31 was a stainless steel capillary column (Ultra ALLOY 50 manufactured by Frontier Laboratories Ltd.) having an inner diameter of 0.25 mm and a length of 2 m and including, on an inner surface, a fixation layer made of a copolymer of methyl phenyl poly siloxane and dimethyl poly siloxane at 5:95 (mole ratio) and having a thickness of 1.0 µm, and the main separation column 32 was a stainless steel capillary column (Ultra ALLOY +-5 manufactured by Frontier Laboratories Ltd.) having an inner diameter of 0.25 mm and a length of 30 m and including, on an inner surface, a fixation layer made of a copolymer of methyl phenyl poly siloxane and dimethyl poly siloxane at 5:95 (mole ratio) and having a thickness of 0.5 µm. The detection unit 41 was a quadrupole mass spectrometric detector (scanning range: m/z 29 to 350).

Analysis was performed under a condition that carrier gas (helium) was supplied at the flow rate of 1.0 ml/min from the carrier gas source 26 to the thermal decomposition furnace 21 through the flow rate control device 25, the split ratio of the split vent 35 was 1/16, the temperature of the GC inlet 23 was 300° C., and the temperature of the isothermal oven 3 was held at 40° C. for two minutes, then heated to 280° C. at the temperature increase speed of 20° C./min, and held at 280° C. for six minutes. The upper part of FIG. 4 illustrates a result of the analysis when the suction pump 5 was not activated at all, and the lower part of FIG. 4 illustrates a result of the analysis when the suction pump 5 was activated before the specimen input and activated for 10 seconds after the specimen input and then stopped.

At the activation of the suction pump 5, after part of the precolumn 31 was immersed in liquid nitrogen in advance, the suction pump 5 was activated and then stopped, the precolumn 31 was removed out of the liquid nitrogen, and the temperature of the isothermal oven 3 was increased under the condition.

Figure 4:
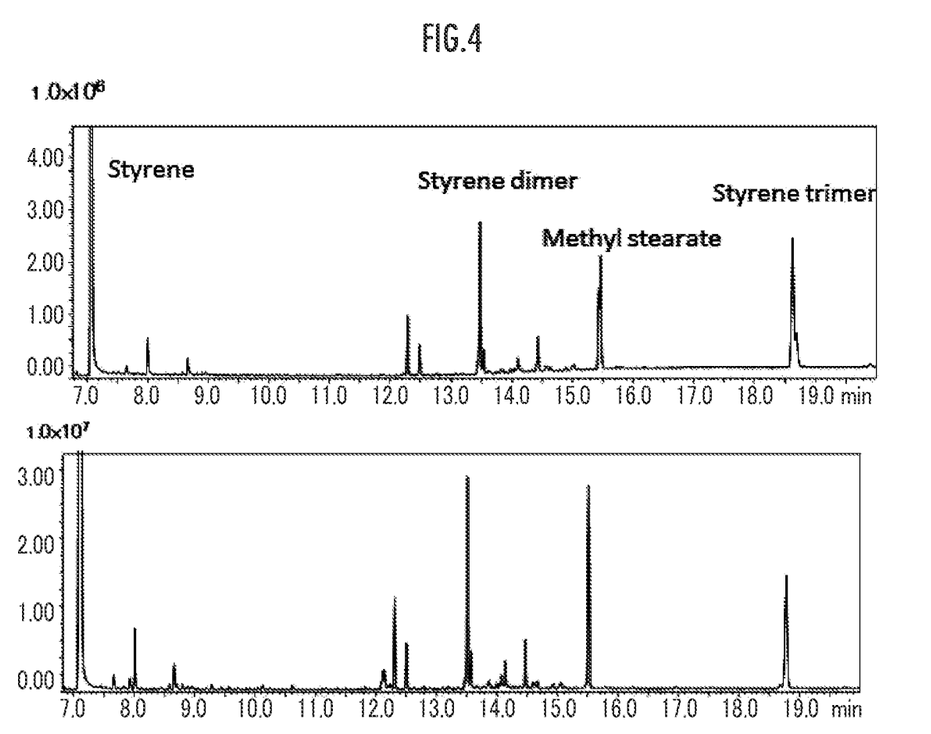
FIG. 4 is a diagram illustrating another exemplary analysis by the gas phase component analysis device and the gas phase component analysis method of the present invention.

In FIG. 4, the absolute intensity in the case in which the suction pump 5 was activated before the specimen input and activated for 10 seconds after the specimen input and then stopped is 10 times larger from $1\times10^6$ to $1\times10^7$ than that in the case in which the suction pump 5 was not activated at all, and the peak area is 12.4 times larger for methyl stearate and 17.6 times larger for styrene trimer, which indicates that excellent detection sensitivity was obtained.

Example 3

In the present example, first, a specimen containing 300 μg of polyethylene, 2 μg of nylon 6,6, and 80 μg of polypropylene was prepared.

Subsequently, in the gas phase component analysis device 1 illustrated in FIG. 2, the specimen was housed in the specimen cup 6 and input to the thermal decomposition furnace 21 heated at 600° C. to thermally decompose the specimen, thereby generating a gas phase component composite.

The gas phase component analysis device 1 of the present example was completely identical to the gas phase component analysis device 1 of Example 2 except that the precolumn 31 was a first stainless steel capillary column having an inner diameter of 0.25 mm and a length of 1 m and including, on an inner surface, a fixation layer made of a copolymer of methyl phenyl poly siloxane and dimethyl poly siloxane at 5:95 (mole ratio) and having a thickness of 0.5 μm or was a second stainless steel capillary column having an inner diameter of 0.25 mm and a length of 2 m and including, on an inner surface, a fixation layer made of a copolymer of methyl phenyl poly siloxane and dimethyl poly siloxane at 50:50 (mole ratio) and having a thickness of 1.0 μm.

Analysis was performed under a condition completely identical to that of Example 2, and the suction pump 5 was activated before the specimen input and activated for 10 seconds after the specimen input and then stopped.

Figure 5:
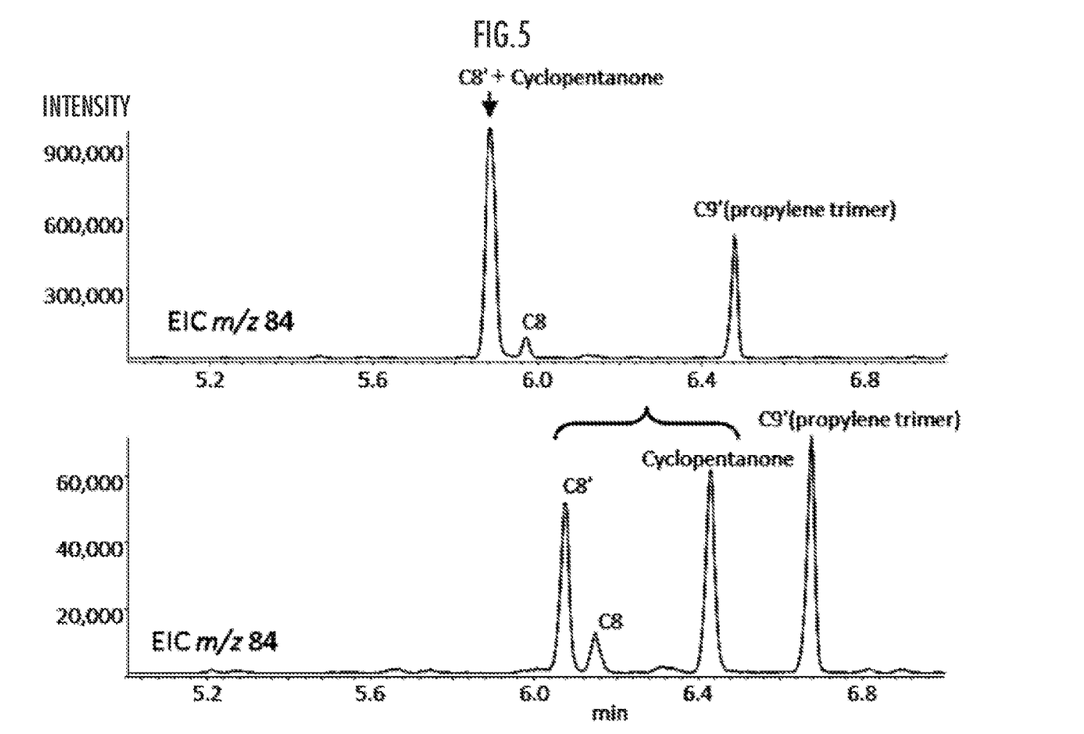
FIG. 5 is a diagram illustrating another exemplary analysis by the gas phase component analysis device and the gas phase component analysis method of the present invention.

The upper part of FIG. 5 illustrates a result of the analysis when the precolumn 31 was the first stainless steel capillary column, and the lower part of FIG. 5 illustrates a result of the analysis when the precolumn 31 was the second stainless steel capillary column. Each analysis result of the present example is an extracted ion chromatogram (EIC) when only the mass ion of m/z 84 is selected in a program for the holding time of 5.2 to 6.8 minutes.

In thermal decomposition of the specimen, C8' of carbon number 8 and one double bond and saturated hydrocarbon C8 of carbon number 8 are generated from polyethylene, cyclopentanone is generated from nylon 6,6, and propylene trimer is generated from polypropylene. When the first stainless steel capillary column was used as illustrated in the upper part of FIG. 5, a peak at the holding time of 5.9 minutes is a mixture of the two components of C8' and cyclopentanone. Improved separation is required for polymer qualitative analysis of polyethylene and nylon 6,6 by using C8' and cyclopentanone.

Studies with various kinds of the precolumn 31 have found that C8' and cyclopentanone can be completely separated as illustrated in the lower part of FIG. 5 by using the second stainless steel capillary column of an increased polar radical concentration.

With a gas phase component analysis method using a separation column, a plurality of compounds are often not separated from one another but detected in an overlapping manner even when the high-resolution main separation column 32 having a length of 30 m or longer is used. In such a case, the polarity of the liquid phase applied on the main separation column 32 needs to be changed to improve separation among a plurality of components. However, for the change, it is required to prepare a new main separation column 32 and perform analysis and discussion again, and thus a significant amount of work and its cost are needed.

With the gas phase component analysis method of the present example, separation can be improved only by changing the precolumn 31 in accordance with an analysis target, and thus it is possible to significantly reduce work for preparation of a new separation column as the main separation column 32 and its cost.

REFERENCE SIGNS LIST 1 gas phase component analysis device
2 heating unit
3 isothermal oven
4 detection unit
5 suction unit
31 first column
32 second column
33 connection unit
35 selective introduction unit

What is claimed is:
1. A gas phase component analysis device comprising:
a heating unit including a thermal decomposition furnace, a heater provided around the thermal decomposition furnace, and a GC inlet into which a leading end of the thermal decomposition furnace is inserted, the heating unit configured to heat a solid specimen, as a specimen housed in a specimen cup input to the thermal decomposition furnace, by the heater to generate a gas phase component composite;
a first column with one end inserted into the GC inlet and facing the leading end of the thermal decomposition furnace, wherein the gas phase component composite generated by the heating unit is introduced into the first column through the one end inserted into the GV inlet;
a second column that is a separation column connected with the first column through a connection unit;
an isothermal oven housing the first column, the second column, and the connection unit;
a detection unit configured to detect a gas phase component having passed through the second column;
a suction unit connected with the connection unit;
an isothermal oven controller; and
a suction unit controller, wherein
the suction unit controller is configured to activate the suction unit to discharge a non-analysis target component to outside through the suction unit,
the isothermal oven controller is configured to control a temperature of the isothermal oven so as to control a temperature of the first column to be higher than a boiling point of the non-analysis target component and lower than a boiling point of an analysis target component so that the analysis target component is selectively captured by the first column while the specimen housed in the specimen cup input to the thermal decomposition furnace is heated, the suction unit controller is configured to stop suction by the suction unit after a predetermined time of being activated, the isothermal oven controller is configured to increase a temperature of the isothermal oven to a temperature equal to or higher than the boiling point of the analysis target component when the suction unit stops suction, and the isothermal oven controller is configured to heat the isothermal oven to the temperature equal to or higher than the boiling point of the analysis target component when the analysis target component is introduced to the second column.

2. The gas phase component analysis device according to claim 1, further comprising a selective introduction unit at the GC inlet, the selective introduction unit configured to selectively introduce part of the gas phase component composite generated by the heating unit into the first column and discharge a rest of the gas phase component composite to outside.

* * * * *